United States Patent [19]

Liautaud et al.

[11] Patent Number: 4,588,938

[45] Date of Patent: May 13, 1986

[54] BATTERY CHARGER

[75] Inventors: James P. Liautaud, River and Bluff Rds., Trout Valley, Cary, Ill. 60013; Peter F. Stultz, Elgin; David L. Maloney, Barrington, both of Ill.

[73] Assignee: James P. Liautaud, Cary, Ill.

[21] Appl. No.: 529,709

[22] Filed: Sep. 6, 1983

[51] Int. Cl.⁴ .............................................. H02J 7/00
[52] U.S. Cl. ............................................ 320/2; 455/89
[58] Field of Search ......................................... 320/2–5, 320/13, 14; 455/89, 90

[56] References Cited

U.S. PATENT DOCUMENTS

| | | | |
|---|---|---|---|
| 3,183,891 | 5/1965 | MacDonald | 320/2 UX |
| 3,644,873 | 2/1972 | Dalton et al. | 320/2 X |
| 3,665,285 | 5/1972 | Mullersman et al. | 320/2 |

FOREIGN PATENT DOCUMENTS 2702129  7/1978  Fed. Rep. of Germany .......... 320/2

Primary Examiner—R. J. Hickey
Attorney, Agent, or Firm—Lockwood, Alex, FitzGibbon & Cummings

[57] ABSTRACT

A battery charger for supplying charging current to the rechargeable battery of a portable battery powered device includes a one-piece housing and removable bottom plate. A first portion of the housing includes a receptacle for receiving the device. Upon insertion of the device into the receptacle electric contacts projecting from the bottom wall of the receptacle are biased by a spring acting against the bottom plate into electrical contact with the device to establish electrical communication between the device and charging circuitry within the housing. A first portion of the circuitry is contained within the first portion of the housing to provide mode indications and switch means user-actuable through an aperture in the bottom wall of the receptacle. A second portion of the circuitry is contained within a second portion of the housing having integral ribs on its exterior surface for improved heat dissipation.

4 Claims, 10 Drawing Figures

U.S. Patent May 13, 1986 Sheet 1 of 3 4,588,938
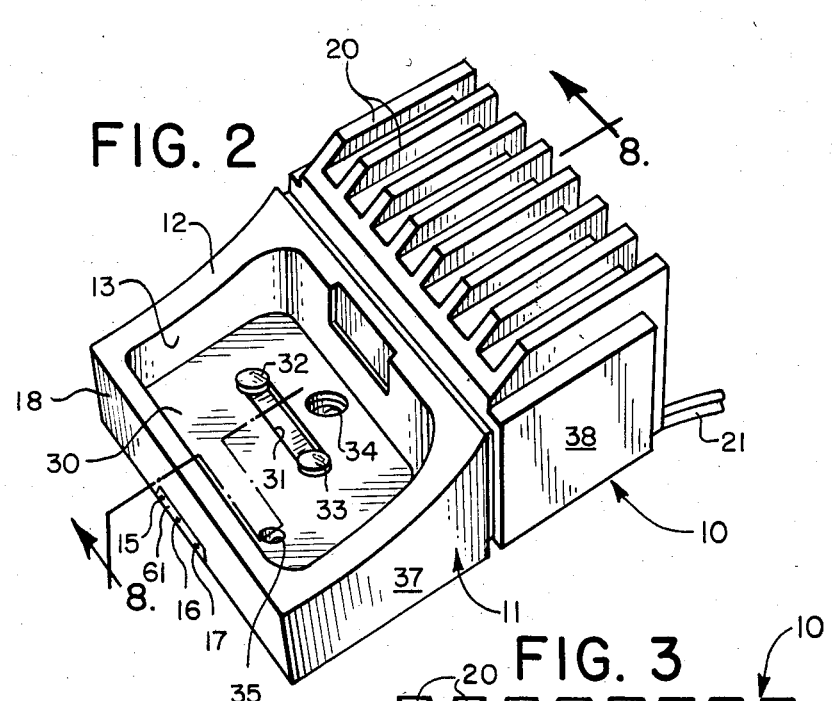
FIG. 2
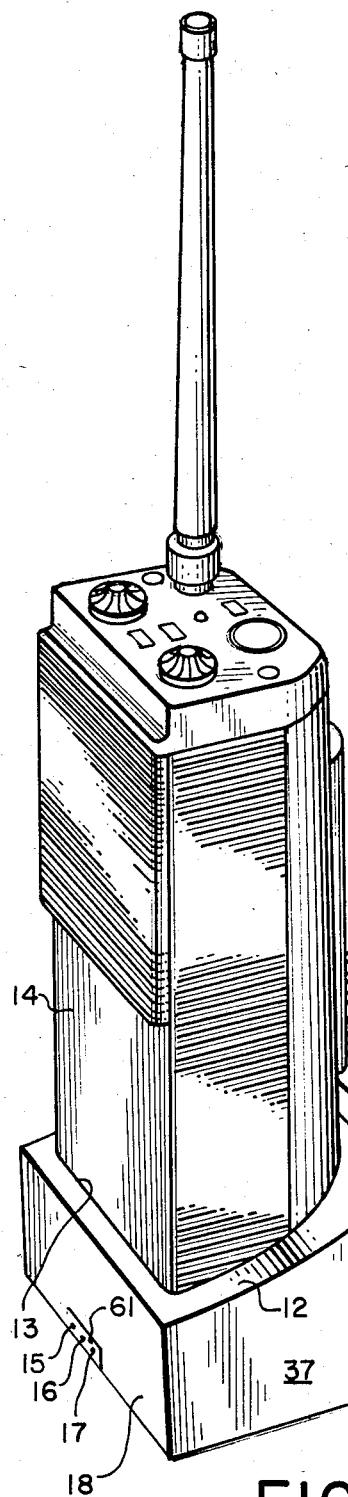
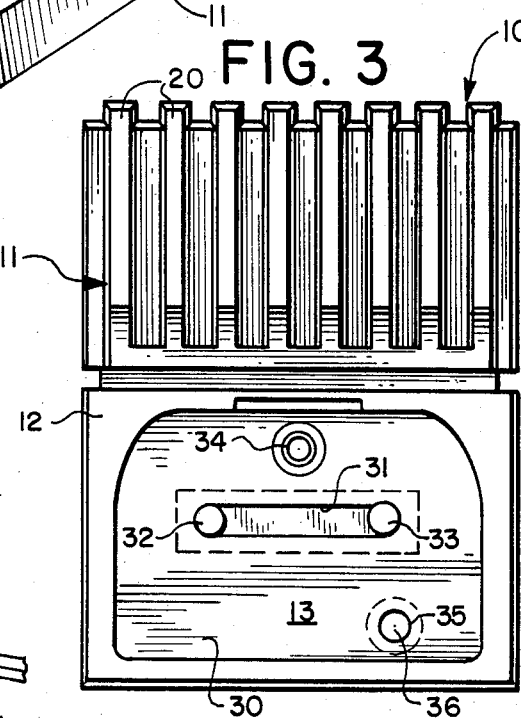
FIG. 3
FIG. 1
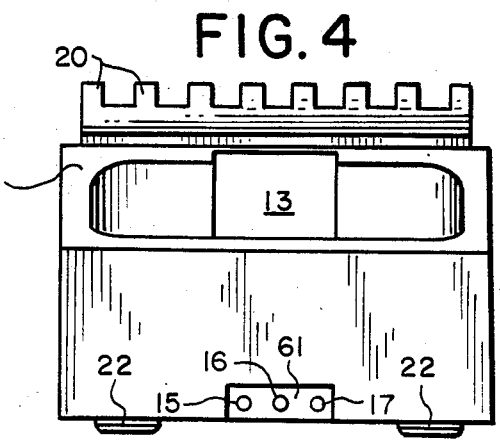
FIG. 4

4,588,938

BATTERY CHARGER

BACKGROUND OF THE INVENTION

The present invention is directed generally to battery chargers, and more specifically to a battery charger construction providing improved heat dissipation and electrical communication with an associated battery powered device.

Portable battery-powered devices such as two-way radios, receivers, recorders and test equipment, which may see frequent use over an extended period of time, typically utilize rechargeable batteries which can be recharged after use, thereby avoiding the expense and inconvenience of repeatedly installing new batteries.

When the batteries become depleted, either the battery is removed from the device and installed into a battery charger, or the entire device with battery installed is installed into the battery charger. The charger contains all necessary power supply and control circuitry for bringing the battery up to full charge. Preferably, the recharging procedure takes place initially at a fast charge rate, and then at a trickle charge rate, and is entirely automatic, requiring no attention or control input by the operator. In addition, in the case of nickel cadmium batteries, an additional deep discharge mode may be required, as described in the copending application of Kenneth Fasen, entitled "Battery Charger Having Automatic Mode Control", Ser. No. 529,860, filed concurrently herewith.

For efficient and convenient charging of the depleted battery it is necessary that connections between the battery, or the battery-powered device, and the charger circuitry be accomplished reliably and in a manner which permits ready installation and removal of the battery or the device from the charger. Furthermore, it is desirable that this connection arrangement be reliable and simple in construction, so as to not unnecessarily add to the cost of manufacturing the charger.

Furthermore, by reason of the adverse operating environment in which the charger may be utilized, wherein the charger may be subjected to extremes of weather and temperature, as well as to physical shock, it is necessary that the charger construction be rugged and economical, and provide good heat dissipation.

Accordingly, it is a general object of the present invention to provide a new and improved battery charger.

It is a further object of the present invention to provide a battery charger of improved mechanical construction.

It is a further object of the present invention to provide a battery charger which provides improved electrical communication with an installed battery powered device or rechargeable battery.

SUMMARY OF THE INVENTION

Accordingly, the invention is directed to a battery charger for applying a charging current to a rechargeable battery. The charger includes a housing defining an interior chamber and including a receptacle for receiving the battery powered device. Circuit means within the housing produce a battery charging current. Contact means are provided for establishing electrical communication between the circuit means and the battery powered device, the contact means including a pair of electrically conductive contacts extending through the bottom wall of the receptacle and mounted on a non-electrically conductive carrier member for movement with respect to the bottom wall so as to mechanically engage the device when the device is seated in the receptacle. Means including a spring are provided for biasing the carrier member toward the device, the spring engaging the assembly between the contacts at one end and the housing at the other end.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a perspective view of a battery charger constructed in accordance with the invention showing the installation of a battery-powered two-way radio therein.

FIG. 2 is a perspective view of the battery charger showing the receptacle thereof with the two-way radio removed.

FIG. 3 is a top plan view of the battery charger.

FIG. 4 is a front elevational view of the battery charger.

DESCRIPTION OF THE PREFERRED EMBODIMENT

Figure 5:
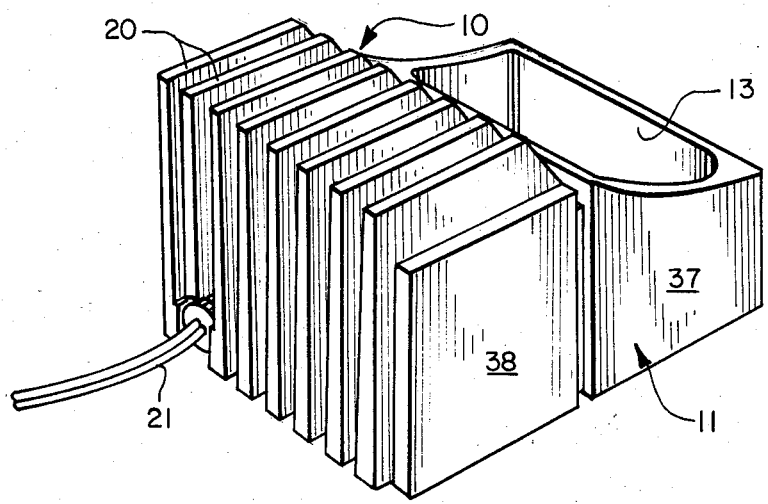
FIG. 5 is a rear perspective view of the battery charger showing the integral finned surfaces thereof.
Figure 6:
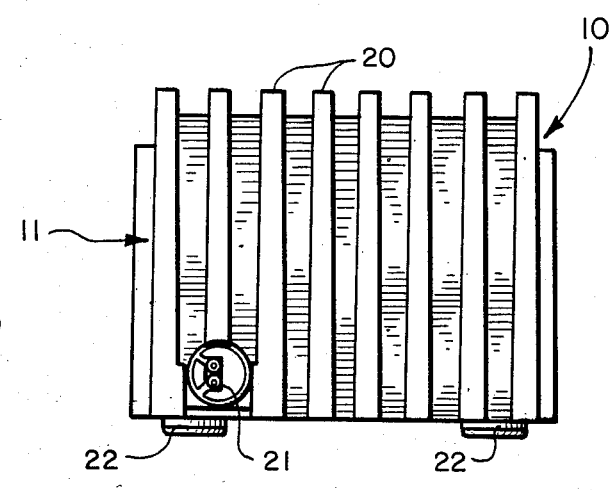
FIG. 6 is a rear elevational view of the battery charger.

Referring to the drawings, and particularly to FIG. 1, a battery charger 10 constructed in accordance with the invention is contained within a housing 11 of generally rectangular construction and formed of an impact-resistant heat dissipating material, such as aluminum. The housing 11 may include a forwardly and downwardly sloped panel 12 on which a receptacle 13 is provided for receiving a battery-powered device 14. Alternatively, the receptacle 13 may be provided with a battery pack adapter (not shown) as described in the copending application of James P. Liautaud et al, entitled "Battery Pack Adapter for a Battery Charger", Ser. No. 529,839, filed concurrently herewith. In this event, a battery pack removed from the apparatus it powers, such as the battery pack described in the copending application of James P. Liautaud et al, entitled "Housing for a Portable Battery-Operated Device", Ser. No. 530,050, filed concurrently herewith, may be installed directly into the battery charger 10.

When either the battery-powered device 14, or a battery pack, is installed in receptacle 13, the installed device is positioned generally vertically as shown, facilitating convenient installation and removal from the battery charger. The operating mode of the charger is indicated by LED indicators 15-17 located on a vertical panel 18 of housing 11. A plurality of fins 20 on the top and rear surfaces of housing 11 are provided to improve heat dissipation from the charger when in use. A line cord 21 may be provided to connect the charger to a conventional alternating current source. A plurality of rubber feet 22 may be provided on the bottom surface of housing 11 to facilitate placement of the battery charger on a flat surface.

To provide for necessary electrical communication between the battery-powered device 14 and the battery charger the bottom wall 30 of receptacle 13 includes a slot-shaped aperture 31 through which a pair of spaced-apart electrically-conductive contacts 32 and 33 project into the receptacle. Also provided in the bottom wall 30 is a threaded aperture 34 for receiving a user-rotatable retaining lug (not shown) on a battery pack adapter. As described in the previously identified application of James P. Liautaud et al, Ser. No. 529,859, the battery adapter includes a user-rotatable lug which fits into the threaded aperture 34 to lock the adapter securely in position within receptacle 13. The bottom panel 30 of receptacle 13 also includes an aperture 35 providing access to a pressure-actuated switch 36 (FIG. 8) within the housing which conditions the charging circuitry of the battery charger to a deep discharge mode.

As shown in FIGS. 2-6, the housing 11 is preferably formed as a single-piece casting, with a front portion generally designated 37 containing the sloped panel 12, the receptacle 13 and the front panel 18, and a second portion generally designated 38 (FIGS. 1, 2 and 5) of generally rectangular construction, which includes the heat-dissipating fins.

Figure 7:
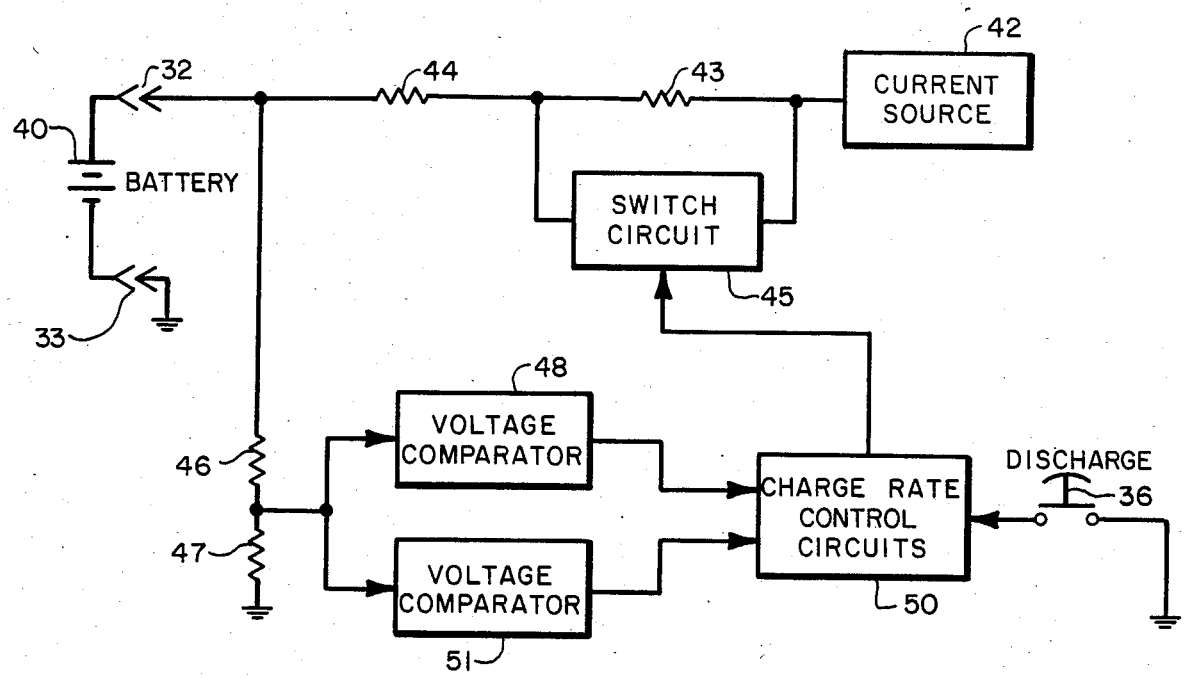
FIG. 7 is a simplified functional block diagram of the battery charging circuit of the battery charger.

Basically, as is shown in FIG. 7, within battery charger 10 current is supplied to the battery 40 of the battery-powered device 14 by a unidirectional current source 42. The output of this current source is applied to battery 40 through a pair of series-connected resistors 43 and 44. A switch circuit 45 is connected in shunt with resistor 43 to enable that component to be effectively removed from the series circuit by establishing a low impedance circuit around the resistor. Contacts 32 and 33 establish electrical contact with battery 40 and allow the device in which the battery is installed to be removed as required.

Battery voltage is sensed by a voltage divider comprising a pair of resistors 46 and 47 connected between the positive terminal of the battery and ground. The juncture of these resistors is connected to a first voltage comparator 48, which compares the battery voltage with a first predetermined reference voltage. If the battery voltage is less than this reference voltage, an output signal is applied to a charge rate control circuit 50 to change the operating mode of the battery charger from a trickle rate to a fast charging rate.

The battery terminal voltage derived at the juncture of resistors 46 and 47 is also applied to a second voltage comparator 51, which functions to compare the battery terminal voltage against a second reference voltage level. In the event that the battery voltage is lower than the second reference level, an output signal is applied to charge rate control circuit 50 to condition that circuit from a discharge mode through a fast charge mode.

Charge rate control circuit 50 is initially conditioned to a discharge mode by the pushbutton switch 36, which provides an appropriate control signal to the control circuit. Depending on the operating mode called for by charge rate control circuit 50, an output from this circuit is applied to switch circuit 45 such that resistor 43 is short-circuited when battery conditions call for a fast charge mode. In the event that a trickle charge mode is required, switch circuit 45 is conditioned non-conductive, effectively returning resistor 43 to the charging circuit and reducing the charging current. Resistor 44 is in the circuit at all times to limit the maximum charging current under the fast charge mode.

Thus, battery charger 10 is automatically conditioned to the appropriate one of its trickle charge, fast charge and discharge modes by charge rate control circuit 50 in accordance with the comparisons effected by comparators 48 and 51 and the input provided by switch 36. Reference is made to the copending application of Kenneth Fasen, entitled "Battery Charger Having Automatic Mode Control", Ser. No. 529,860, filed concurrently herewith, for a detailed explanation of the structure and function of the battery charger circuitry.

Figure 8:
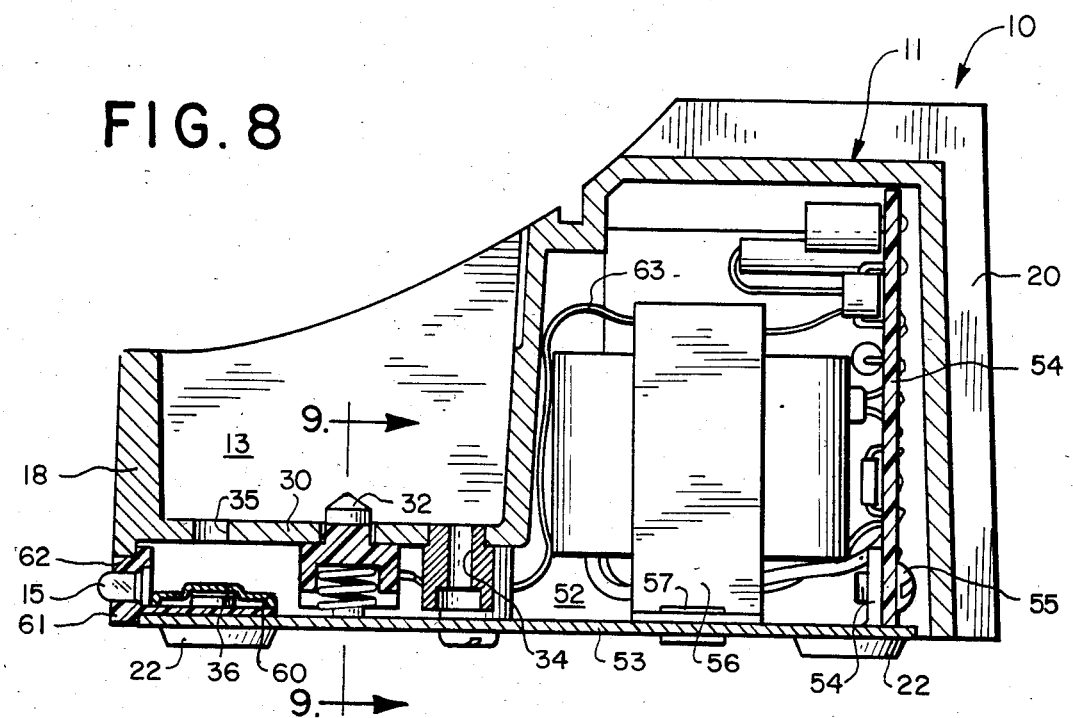
FIG. 8 is an enlarged cross-sectional view of the battery charger taken along 8—8 of FIG. 2.

Referring to FIG. 8, housing 11 is seen to comprise a one-piece casting forming an internal chamber 52 within which the circuit components of the battery charger are contained. The compartment 52 is open to the bottom of housing 11. A bottom plate 53 formed of steel or other rigid electrically-conductive material is disposed over the bottom of the housing to enclose compartment 52.

The circuitry of the battery charger is contained on a first printed wiring board 54 mounted in vertical alignment to bottom plate 53 adjacent the rear wall of housing 11. A mounting tab 54 is provided in bottom plate 53 for receiving a machine screw 55 or other appropriate mounting means for circuit board 54. Also provided in the portion 38 of housing 11 is a transformer 56, which is mounted to bottom plate 53 by rivets 57 or other conventional means so as to extend up within the interior of portion 38. Thus arranged, circuit board 54 and transformer 56 are efficiently packaged within the housing portion so as to take advantage of the heat dissipating attributes of the external fins 20.

A second portion of the battery charger cirucitry is contained on a second circuit board 60 located in the forward portion 37 of housing 11. This circuit board is mounted parallel to bottom plate 53 and may be attached by cementing or other appropriate means to a molded plastic spacer 61 for supporting indicator lights 15-17. Thus situated, spacer 61 serves the dual purpose of insulating circuit board 60 from bottom plate 53, and of providing electrical connections and support to the LED indicator devices. An aperture 62 in the front panel of portion 37 allows the three LED indicators in element 61 to extend into view on the surface of the front panel, as shown in FIGS. 1 and 2 and 4.

Circuit board 60, by reason of the underlying support provided by member 61, can accommodate the pressure-actuated switch 36. As previously described, this switch is actuated through aperture 35 in bottom wall 30 of receptacle 13 to initiate operation in the deep discharge mode. Necessary electrical connections between switch 36 and LED devices 15-17 are provided by a cable 63 extending between circuit board 60 and circuit board 54.

Figure 9:
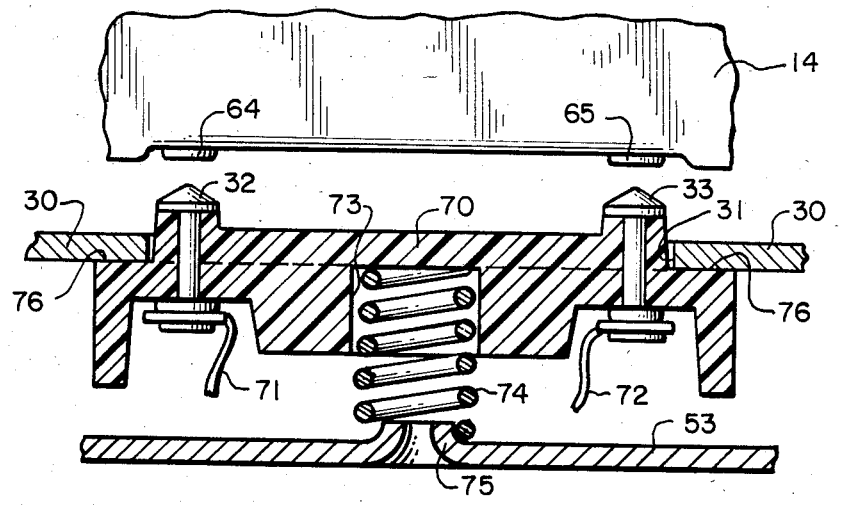
FIG. 9 is an enlarged cross-sectional view taken along line 9—9 of FIG. 8 showing the construction of the contact assembly for establishing electrical communication with a battery-powered device installed in the charger showing the contact assembly prior to installation.
Figure 10:
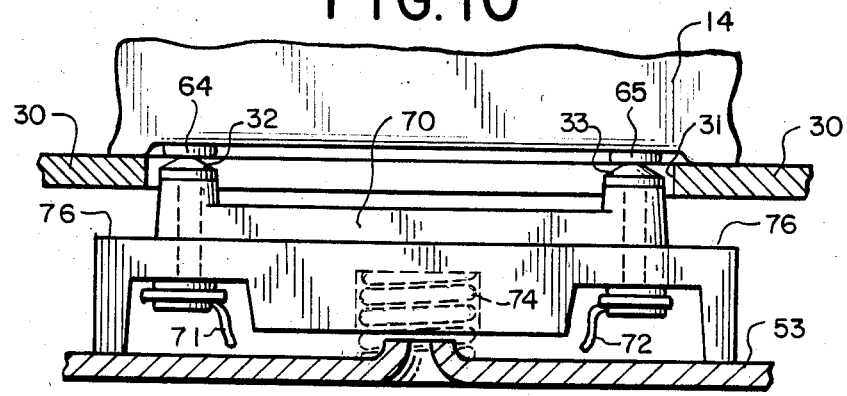
FIG. 10 is an enlarged cross-sectional view similar to FIG. 9 showing the contact assembly with the battery-powered device installed.

In further accord with the invention, and as shown in FIGS. 9 and 10, the contacts 32 and 33 provided for establishing electrical contact with the battery-powered device 14 are arranged to make contact with complementary contacts 64 and 65 on the housing of device 14. Contacts 32 and 33 are seen in FIG. 9 to comprise rivet-like elements carried on a movable electrically non-conductive carrier 70 formed of plastic or other suitable material. Electrical connections are established to contacts 32 and 33 by means of flexible wires 71 and 72, respectively, connected to the bottom surfaces of the contacts as they extend through carrier 70. Carrier 70 includes in an enlarged center portion, intermediate contacts 32 and 33, an aperture 73 for receiving a helical spring 74. This spring is seated within recess 73 at one end and engages a raised portion 75 of bottom plate 53 at its other end so as to bias the carrier 70 upwardly toward device 14. A projecting portion of the carrier containing contacts 32 and 33 projects through the slot-shaped aperture 31 provided in bottom wall 30, and shoulder portions 76 at either end of the carrier limit the projection.

Upon installation of the battery-power device 14 as shown in FIG. 10, spring 74 is compressed and carrier is caused to move downwardly toward bottom plate 53. Electrical contact is made between contacts 32 and 33 and contacts 64 and 65 as shown, spring 74 serving to maintain these opposing contacts in tight mechanical engagement. Since spring 74 is captured at one end by recess 73 and at its other end by the raised portion 75 of bottom plate 53, the spring is maintained in position at all times.

Thus, a simple and efficient contact arrangement is provided for establishing electrical communication with an installed battery-powered device. The connection arrangement is reliable and requires a minimal number of parts, thereby reducing the cost of manufacture. At the same time, the novel arrangement of the battery charger circuitry within the housing provides for efficient mode indication and heat dissipation, and for economical assembly through multiple use of a single bottom plate. Furthermore, access to the interior circuitry for adjustment or repair is achieved by merely removing the single bottom plate, exposing all components.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A battery charger for supplying a charging current to a battery-powered device having a pair of spaced-apart charge current receiving contacts on the bottom surface thereof, comprising:

a housing defining an interior chamber and a receptacle having side walls and a bottom wall opening to the exterior of said housing, and including at least one aperture in the bottom wall, for receiving the bottom surface of the battery-powered device;

circuit means within said interior chamber for producing a battery charging current;

contact means for establishing electrical communication between said circuit means and the contacts of the battery-powered device, said contact means including an electrically non-conductive contact carrier disposed within said interior chamber and movable relative to said bottom wall, and having a pair of non-resilient electrically-conductive contact members mounted in spaced relationship thereon, each of said contacts projecting through an aperture in the bottom wall of said receptacle and into mechanical engagement with respective ones of the charge current receiving contacts of the device when the device is seated in the receptacle; and means comprising a spring for biasing said contact carrier toward said device, said spring engaging said carrier intermediate said contacts at one end and said housing at the other end.

2. A battery charger as defined in claim 1 wherein said charger housing includes a metallic bottom plate enclosing said interior chamber, and said spring comprises a helical spring engaging said carrier at one end and said bottom plate at the other end.

3. A battery charger as defined in claim 2 wherein said bottom plate is deformed to form an engaging surface for said spring.

4. A battery charger as defined in claim 1 wherein said non-resilient contact members comprise rivet-like members extending through said contact carrier.

* * * * *